No. 227,954.
E. BUSS.
Filter.
Patented May 25, 1880.
2 Sheets—Sheet 1.
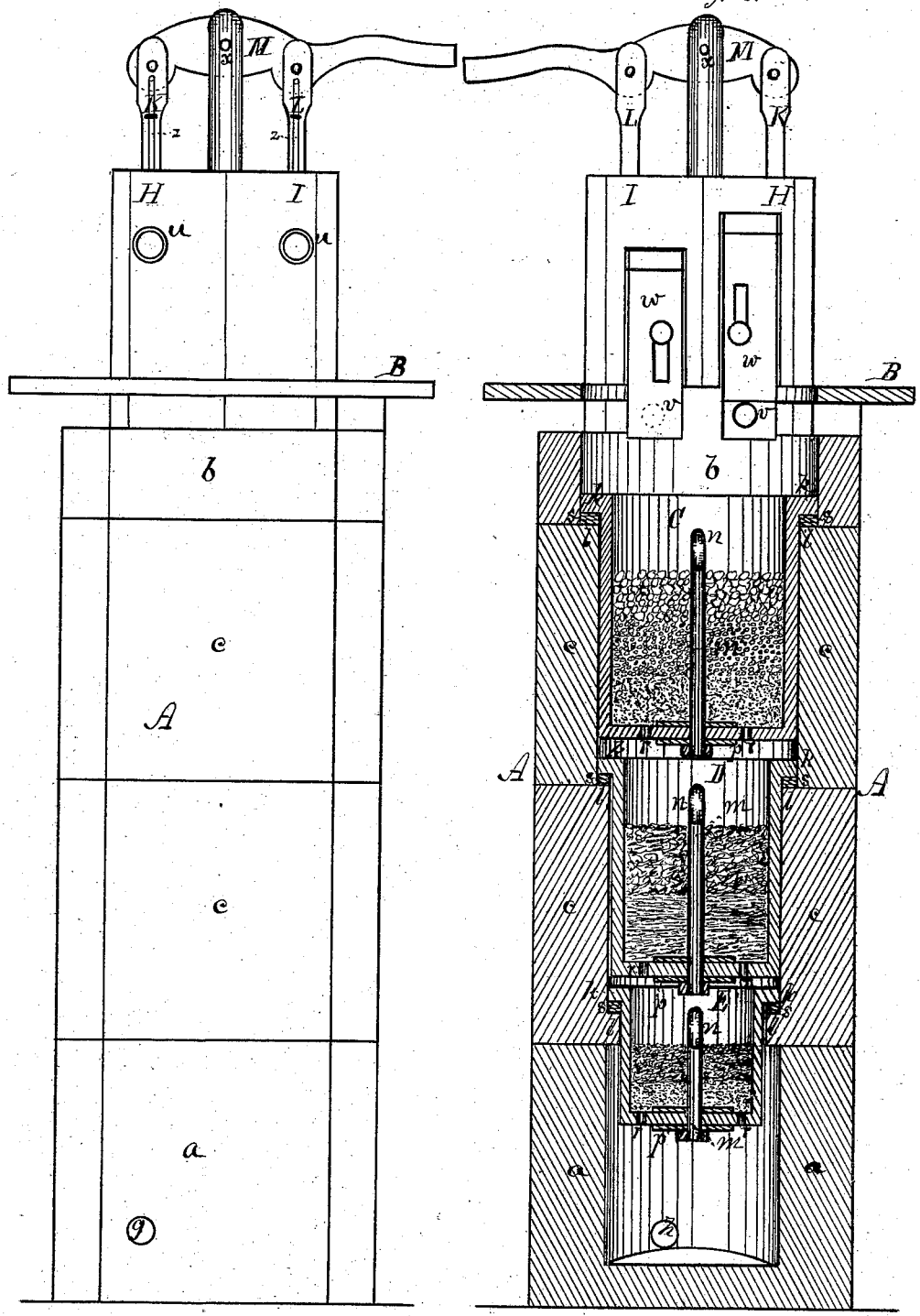
Witnesses:
T. C. Day
James Wright
Inventor:
Ezra Buss,
By his attorney,
J. S. Brown.

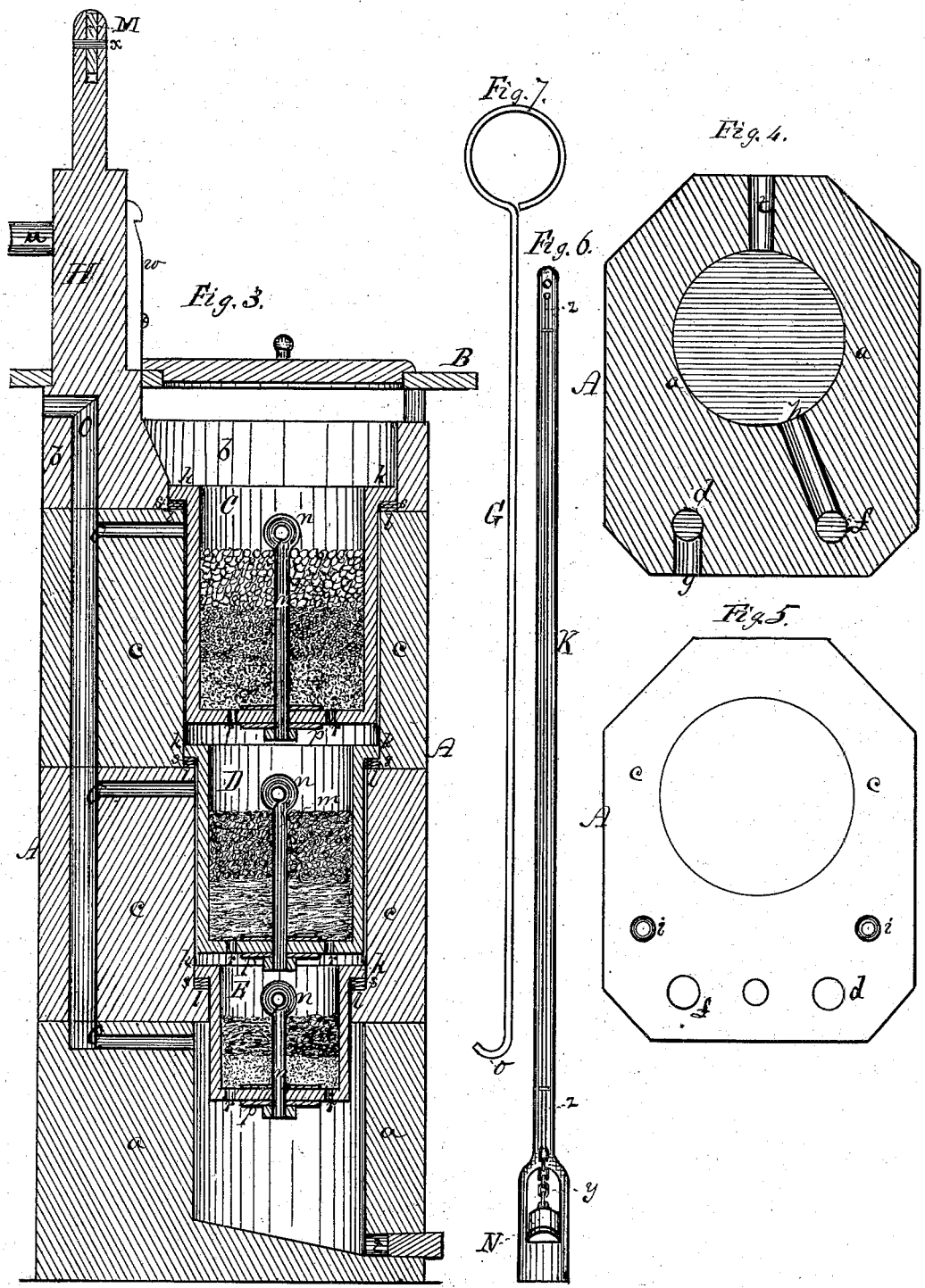

UNITED STATES PATENT OFFICE.

EZRA BUSS, OF SPRINGFIELD, OHIO.

FILTER.

SPECIFICATION forming part of Letters Patent No. 227,954, dated May 25, 1880.

Application filed January 2, 1880.

*To all whom it may concern:*

Be it known that I, EZRA BUSS, of Springfield, in the county of Clarke and State of Ohio, have invented an Improved Filter; and I do hereby declare that the following is a full and exact description thereof, reference being had to the accompanying drawings, making part of this specification—

Figure 1 being a front elevation of the filter; Fig. 2, a central vertical section thereof, looking in a direction opposite to the view in Fig. 1; Fig. 3, a central vertical section of the same in a plane at right angles to the view in Fig. 2; Fig. 4, a horizontal section near the bottom of the filter; Fig. 5, a view of the under side of one of the sectional parts composing the filter; Fig. 6, a side view of one of the filter pump-pistons and piston-rods; Fig. 7, a side view of an instrument employed for removing and replacing the vessels which hold the filtering materials.

Like letters designate corresponding parts in all of the figures.

My improved filter is specially intended for and adapted to cisterns, reservoirs, wells, and situations where the filter stands and is partly immersed in the water to be drawn from and filtered; and in adapting the filter to this use I employ two pumps, one communicating with the cistern or other water in which the filter is placed, and the other communicating with the interior of the filter; and, further, I arrange these pumps to be operated simultaneously, so that as fast as filtered water is drawn from the filter an equal quantity of water is drawn up from the cistern and discharged into the upper part of the filter, in order that the filter may be kept unfailingly supplied with water. Yet since it is sometimes desirable to supply water to the filter without drawing water therefrom, and also to draw water from the filter without adding more to it, I construct and arrange these pumps so that by a simple adjustment either pump may be rendered inoperative while the other is at work. By this means, also, water may be drawn for use directly from the cistern without filtering, and the warm water standing in the filter-pump may be returned to the filter to get cool water from the bottom of the filter.

In the drawings, A represents the body of the filter. For convenience of construction and transportation I make this body in sectional parts, of which the lower part, $a$, upon which the other parts rest, is a close reservoir containing a quantity of filtered water, which furnishes the immediate supply to the drawing-pump. The upper part, $b$, may support the two pumps, or may be connected with a suitable platform, B, covering the filter and cistern, and any number of intermediate parts, $c c$, are added, of like construction, according to the depth of cistern supplied or height of filter required. These intermediate sections serve, as well as the lower section, $a$, to hold the several filter-vessels C D E, generally one in each section, as shown, and the water in filtering passes successively down through them into the lower section; and since I find it preferable to locate the pumps within the body of the filter, the several sections have pump-apertures $d f$ vertically through them for the passage of the water, except the lower section, $a$, which has lateral openings leading from the two pump-apertures, respectively, one opening, $g$, leading from the cistern-pump aperture $d$ out into the cistern, and the other opening, $h$, leading from the filter-pump aperture $f$ inward to the interior of the filter. These pump apertures $d f$ might be, but are not necessarily, lined with continuous pump-tubes, and I have not represented any in the drawings.

The stationary valves of the pumps are conveniently located in the lower section, $a$, of the filter, near the lower ends of the apertures $d f$.

I prefer to make the body A of the filter of artificial stone or composite materials, as the cheapest in construction and most suitable and unchangeable for holding the water, as well as readily made at any place; but I do not confine myself to this material. Baked clay, metal, or cast-iron, or even wood, may be employed.

In order to keep the sections $a\ b\ c\ c$ properly connected, united, and in position, I form suitable dowel-pins, $i\ i$, (shown in Fig. 5,) say, on the under side of the several sections above the lower section, $a$, and corresponding dowel-holes to receive the pins in the tops of the several sections below the upper section, $b$, or vice versa; but though this is a simple and cheap means of connecting the sections, any equivalent means may be employed.

The several filter-vessels are located and sustained in the several sections of the filter-body, occupying central apertures in the same.

The construction of these filter-vessels and the manner of sustaining them in the filter-body sections so as to insure all of the water received being filtered through the filtering materials in the filter-vessels, and so that these filter-vessels may be, one or all, easily and quickly removed for changing or cleansing the filter materials and again replaced, are peculiar and form important features of my invention.

Each filter-vessel (whether round, as shown, or of any other peripheral form) has a rim, shoulder, or flange, $k$, projecting outward all around its periphery, to rest upon a shoulder or offset, $l$, in the body or in each body-section, for supporting the filter-vessel, and the central apertures in the body-sections of the filter are so proportioned in width or diameter, one above another, and the several filter-vessels, one above another, are correspondingly so proportioned in diameter, that the smallest filter is at the bottom or in the lowest body-section, and fits the central cavity therein; and the next higher filter-vessel has its body of a diameter as great as the rim or flange of the vessel below, with the aperture in the body-section in which it is located of the proper size to receive it, and so on successively to the top. The body of the next higher filter-vessel corresponds in diameter with the rim of the filter-vessel below, or nearly so, each fitting the aperture in its body-section, by which construction, while each filter-vessel is fully and closely sustained in its body-section, each can be drawn up through the entire filter from its own seat, beginning with the top vessel, and again let down into the filter, beginning with the lowest one withdrawn.

To facilitate the withdrawal of the filter-vessels I locate centrally and permanently in each a vertical rod, $m$, with a loop or eye, $n$, in the upper end, into which the hook end $o$ of a lifting-rod, G, can be readily hooked to draw the vessel up by. I provide each filter with such a lifting-rod as a matter of convenience.

Since I contemplate making the filter-vessels of artificial stone or earthenware, (though they may be made of various other materials,) I attach the respective rods $m$ $m$ thereto so as to be secure and not be liable to break the vessels. Thus I pass the rod of each centrally through the bottom of the vessel, and secure a broad washer-plate, $p$, thereto below the bottom of the filter-vessel, and I prefer to secure a similar plate to the rod above the bottom of the vessel.

Suitable holes $r$ $r$ are made through the bottom of each vessel to allow the filtered water to pass through.

In order to prevent the passage of any water downward outside of the vessels I place packings or gaskets of india-rubber, $s$ $s$, under the supporting-rims of the several filter-vessels, where they rest on the shoulders of the supporting-sections of the filter-body.

The several filter-vessels are to be filled with any desired filtering materials, such as gravel, sand, charcoal, fibrous substances, &c., and the several vessels preferably have different filtering materials of one or more kinds in each. Thus I carry the successive filterings to any extent desirable, and still filter as rapidly as desired, since an abundance of water is constantly supplied to the top of the filter and abundant time is ordinarily and necessarily given for all the successive stages of the filtering.

The lower section, $a$, of the filter-body has an outlet, $t$, closed by a plug, whereby any sediment, if it ever gets into the lower part of the filter, can be drawn off, and I make the interior bottom thereof inclined, as seen in Figs. 2 and 3, to facilitate the drawing off.

The two pump-bodies H I, above the platform or support B, have each a spout, $u$, through which to draw off water from the cistern or the filter, as the case may be, and also from each is a spout or discharge-outlet, $v$, discharging into the top of the filter. These outlets $v$ $v$ are respectively closed or opened by sliding plates or valves $w$ $w$, so that either, neither, or both pumps may discharge into the filter. These discharge-outlets are situated a little lower than the spouts $u$ $u$, so that when they discharge, one or both, the spouts, one or both, corresponding therewith will not discharge water.

The two piston-rods K L are connected with the single operating-lever M, respectively, on opposite sides of and equidistant from the fulcrum-pivot $x$ of the lever, so that ordinarily the two pumps work simultaneously and equally, and the same quantity of water is constantly added to the filter at the top as is drawn from it at the bottom, and it is thus continually kept supplied with water; but since it is desirable sometimes to have only one pump work, as when, on the one hand, the filter is required to be more fully charged, or, on the other hand, when it is desired to draw water from the cistern and not from the filter, I provide a simple means of rendering either pump inoperative at any time, as represented in Fig. 6. This consists in a short chain, cord, or other flexible connection, $y$, attached to the movable side of the valve N of each piston, and at the other end to a sliding rod, $z$, secured in loops or ways at the side of the piston-rod, so that it will remain in any position to which it is moved by sliding up and down. This rod reaches up to near the top of each pump, or where it can be readily reached by the person drawing water from the cistern. When the rod is drawn up, as shown in the drawings, the valve N is held raised from its seat and the pump does not lift water; but on sliding down the rod till the valve is allowed to rest on its seat the pump works as usual.

A hole or passage, O, extends up through the filter-body and communicates with the interior of each body-section by side apertures below each supporting flange or rim of the filtering-vessels, as shown in Fig. 3, and also, by a side aperture or otherwise, it opens to the outer air above all the filter-vessels. The purpose of this is to allow a free circulation of air, so as to freely allow the descent of water into and the drawing of water from the filter and to aerate the water therein. Of course separate apertures or passages might be employed with the several sections and filter-vessels; but a single passage is simpler, more compact, and in every respect preferable.

What I claim as my invention, and desire to secure by Letters Patent, is—

1. In a filter, the combination of a series of filter-vessels, C D E, of gradually-diminishing diameter in succession, and each provided with a supporting-flange around its periphery, with a filter-body, A, provided with a filter aperture or cavity formed of a series of sections successively diminishing in diameter from the top toward the bottom, and forming shoulders or shelves at the downward terminations of the successive larger diameters, the said filter vessels and body being so adapted to each other that the flanges of the former rest respectively on the said shoulders and the filter-vessels are readily removable and replaceable in succession, substantially as and for the purpose herein specified.

2. The combination of the series of successively-diminishing filter-vessels provided with flanges and with apertures through their bottoms, the filter-body having the successively-diminishing sections terminating in shoulders, and the gaskets s s between the said flanges and shoulders, substantially as and for the purpose herein specified.

3. The filter-vessels provided with lifting-rods, as described, secured to the respective vessels by extending through the bottoms thereof and by washers or plates connected therewith below and above the bottoms, substantially as and for the purpose herein specified.

4. The combination, with a filter, of two pumps, one communicating with and drawing from the interior of the filter, and the other communicating with and drawing from the cistern or water-supply, and respectively provided with discharge-spouts, constructed to discharge either into receiving-vessels or into the top of the filter, substantially as and for the purpose herein specified.

5. In combination with a filter and with a cistern or reservoir in which the filter is placed, two pumps, one connected with the cistern and the other with the interior of the filter, and discharging one into the top of the filter and the other into a receiving-vessel, and having their piston-rods connected with a single actuating-lever, whereby an equal quantity of water is drawn from the filter and supplied to it, substantially as herein specified.

6. The openings in the respective pump-bodies for discharging water therefrom into the upper part of the filter, opened and closed by valves, in addition to the regular discharge-spouts of the pumps, in combination with the filter, substantially as and for the purpose herein specified.

7. The combination of the two pump-pistons, actuated by one handle or lever, M, valve-lifting slides z z on the piston-rods K L, and the valves w w, operating to open or close openings which discharge water from the pumps into the upper part of the filter, substantially as and for the purpose herein specified.

8. The air-circulating passage in the body of the filter, communicating with the interior thereof below the rims of the several filter-vessels, substantially as and for the purpose herein specified.

9. A filter-body composed of a series of detachable sections, as specified, the said sections when united forming continuous pump-holes d f, extending from the bottom to the top, substantially as and for the purpose herein specified.

The foregoing specification signed by me this 24th day of November, 1879.

EZRA BUSS.

Witnesses:
E. D. BUSS,
M. W. BUSS.